United States Patent [19]

Komoto

[11] Patent Number: 4,799,561

[45] Date of Patent: Jan. 24, 1989

[54] ELECTRONIC BALANCE

[75] Inventor: Akira Komoto, Otsu, Japan

[73] Assignee: Shimadzu Corporation, Kyoto, Japan

[21] Appl. No.: 191,411

[22] Filed: May 9, 1988

[30] Foreign Application Priority Data

May 9, 1987 [JP] Japan ............................ 62-113133
Jun. 26, 1987 [JP] Japan ............................ 62-98853

[51] Int. Cl.⁴ .......................... G01G 3/08; G01G 7/00
[52] U.S. Cl. ................................ 177/229; 177/212
[58] Field of Search ............................ 177/212, 229

[56] References Cited

U.S. PATENT DOCUMENTS

| 4,343,373 | 8/1982 | Stadler et al. | 177/212 X |
| 4,526,247 | 7/1985 | EerNisse et al. | 177/229 X |
| 4,653,600 | 3/1987 | Melcher et al. | 177/229 |
| 4,678,050 | 7/1987 | Wirth et al. | 177/229 |
| 4,682,664 | 7/1987 | Kemp | 177/229 X |
| 4,732,228 | 3/1988 | Danhamer | 177/229 X |

Primary Examiner—George H. Miller, Jr.
Attorney, Agent, or Firm—Koda and Androlia

[57] ABSTRACT

An electronic balance in which a means for transmitting a force due to a weight loaded on a weighting pan to a weight sensing means is made of one metallic block from which are integratedly cut out a Roberval mechanism, a lever and a connecting portion for connecting the lever to the Roberval mechanism.

5 Claims, 4 Drawing Sheets

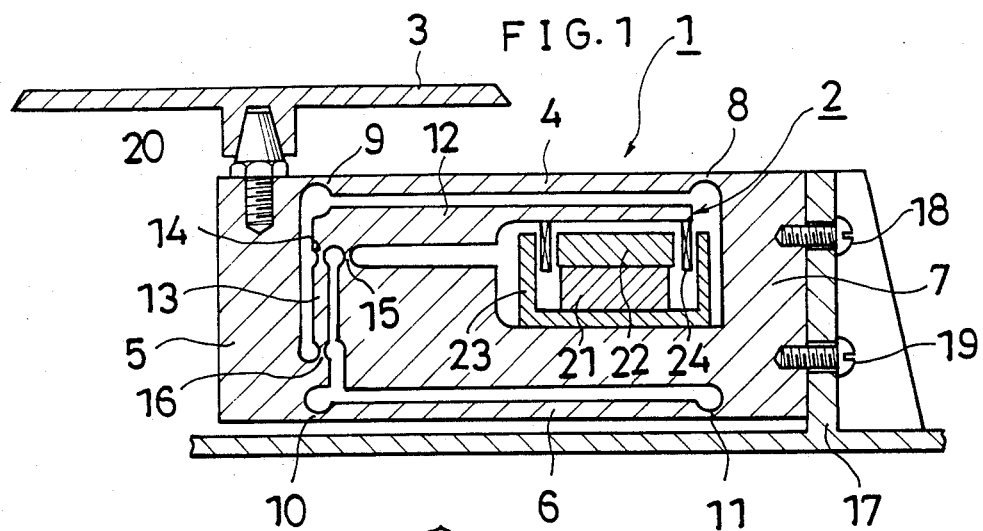
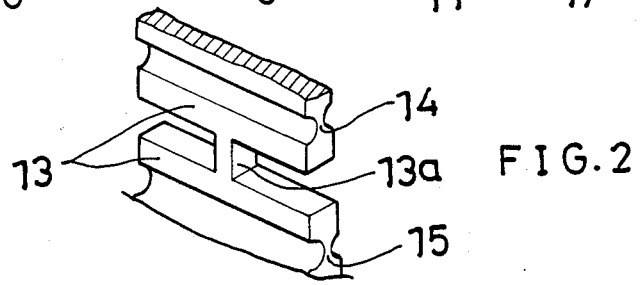
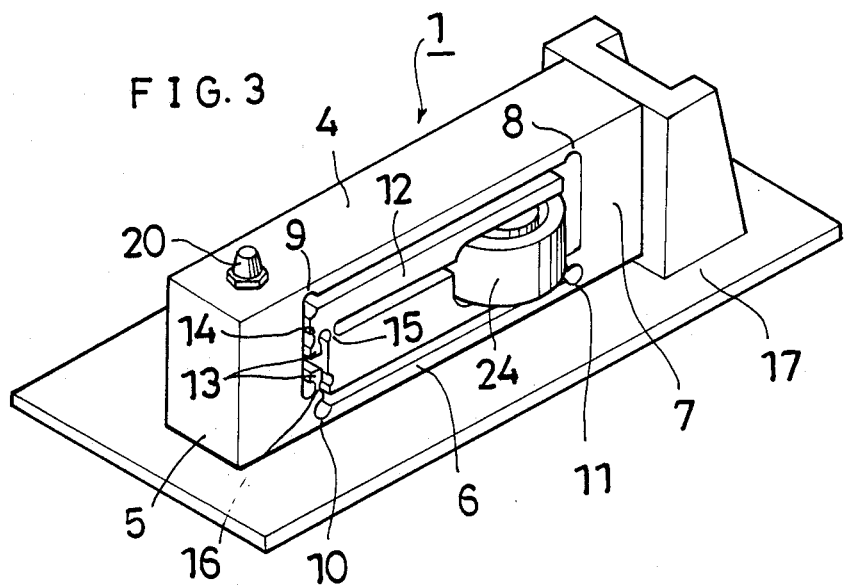

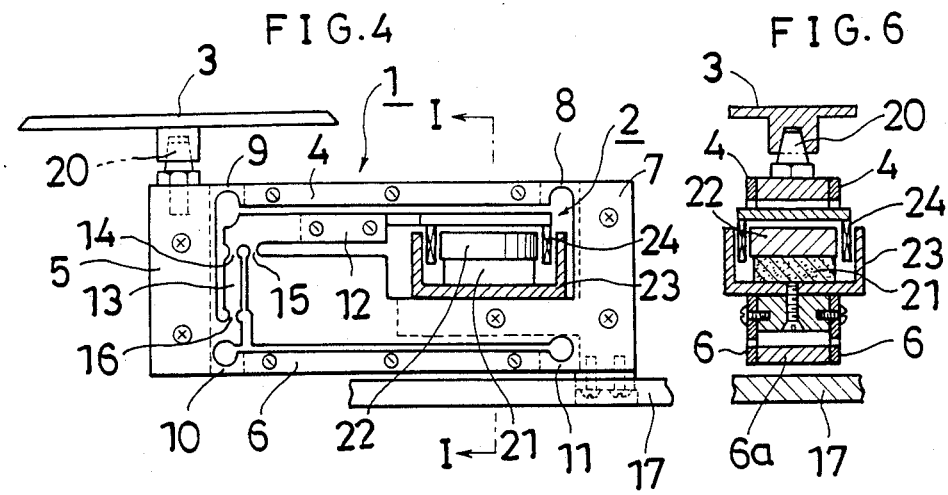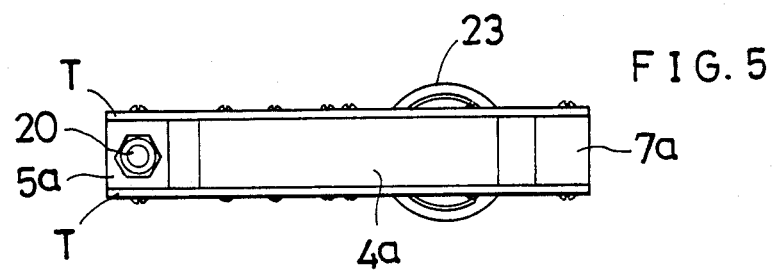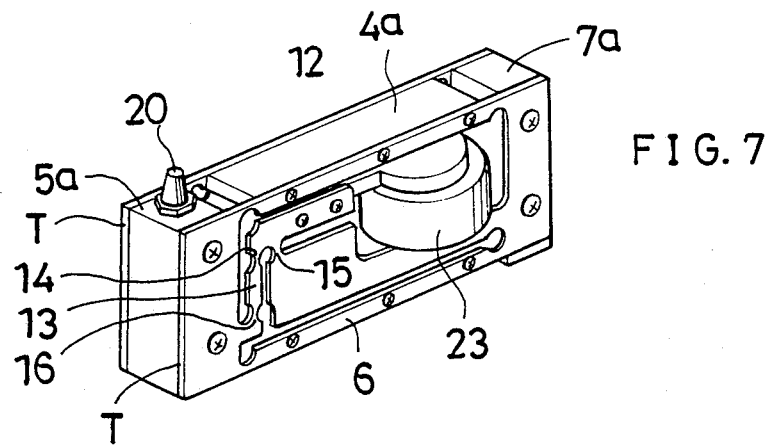

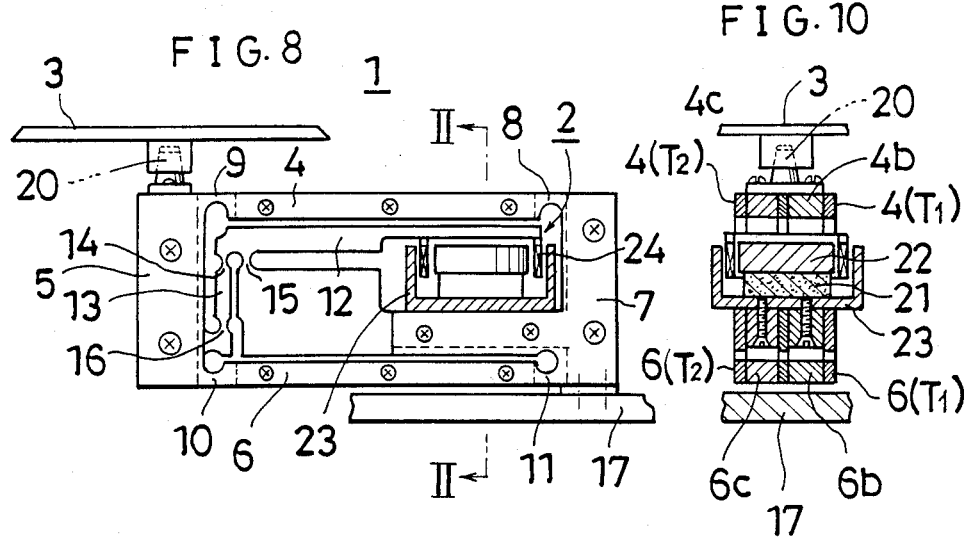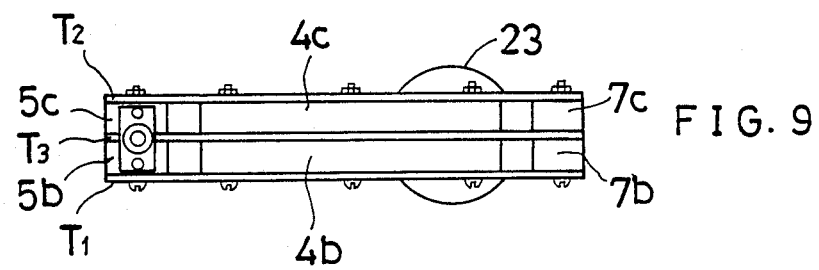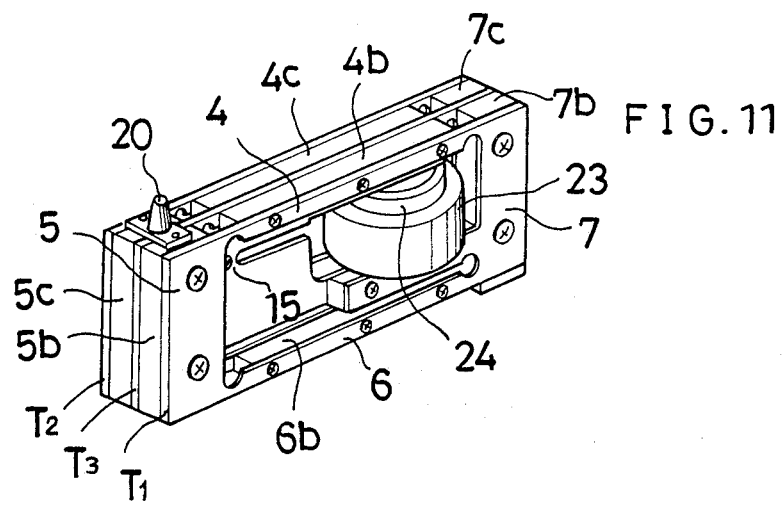

ELECTRONIC BALANCE

BACKGROUND OF THE INVENTION

The present invention relates to an electronic balance in which an improved Roberval mechanism is used.

An electronic balance of a type in which the weighing pan is positioned above the weight receiving mechanism has that weight receiving mechanism constituted in the form of a Roberval mechanism. The Roberval mechanism is a parallelogram consisting of four side members linked by means of pivots or elastic joints. Two of the four side members are kept vertical with one fixed so as not to move and with the other prolonged upward to support the weighing pan. In many cases the fixed vertical side member is replaced by a vertical column-like member integrated with or fixed to the base frame of the balance. The other (not fixed) vertical side member supporting the weighing pan is accompanied by a lever mechanism for transmitting a weight force given on the weighing pan to an electronic weight sensor. Thus the weight loaded on the weighing pan is transmitted to the weight sensor through the Roberval and the lever mechanisms.

However, since such a weight force transmitting system consists of a plurality of separate consistuents such as the lever mechanism, the four side members of the Roberval mechanism, and the pivots or the elastic joints, the system is made very complicated. In addition these constituents are in general made of different materials; the Roberval mechanism and the lever are, for example, made of die-cast aluminum alloy, while the joint members such as the pivots and elastict joints are of steel. These constituents are assembled to form the weight force transmitting system by using bolts, nuts, adhesives and other suitable connecting or fixing means. Therefore, the difference in thermal expansion coefficient among the materials used may cause, when the ambient temperature varies, the system to be distorted and, as a result, may give variations to the friction at the pivotally jointed portions and to the elasticity of the elastic joints. The conventional electronic balance is thus accompanied by the risk that the precision and stability are affected by the ambient temperature variations.

OBJECTS AND SUMMARY OF THE INVENTION

The present invention aims at eliminating the disadvantages accompanying a conventional electronic balance owing to the conventional weight force transmitting mechanism as mentioned above, and makes it an object to provide an electronic balance made free from the adverse effect of ambient temperature variations with an improved weight force transmitting system employed.

Another object of the present invention is to constitute such an improved weight force transmitting system in a simple construction.

A further object of the present invention is to make it possible to easily provide various such an improved weight force transmitting systems having different sensitivity.

A weight force transmitting system based on the principal idea of the present invention is made up of one body in which a Roberval and a lever mechanisms are integrated by cutting out from a metal block a pattern integrating both the mechanisms including all joint portions concerned. According to the present invention, another type of weight force transmitting system can be fabricated by assembling a plurality of unit systems similar to the above weight force transmitting system in parallel to one another with the unit systems cut out not from a metal block but from a metal plate.

According to the weight force transmitting system based on the present invention the Roberval mechanisms, lever mechanism and related joint portions are integrated in one body made of the same material, and therefore the disadvantages mentioned previously in regard to a conventional electronic balance are completely eliminated in substance. In addition the manufacturing process is very much simplified because the system is substantially completed only by being cut out from a mother metallic material.

BRIEF DESCRIPTION OF THE DRAWINGS

In the following the present invention is described in further detail on reference to accompanying drawings, in which:

FIG. 1 shows a cross-sectional view of the electronic balance which is an embodiment of the present invention;

FIG. 2 shows a partial perspective view illustrating the detail of the portion connecting the lever to the Roberval mechanism, both being shown in FIG. 1;

FIG. 3 shows a perspective view of the above embodiment shown in FIG. 1, with the weighing pan removed;

FIG. 4 shows the front view of another embodiment of the present invention;

FIG. 5 shows a plan view of the embodiment shown in FIG. 4, with the weighing pan removed;

FIG. 6 shows the cross-sectional view taken along line I—I of FIG. 4;

FIG. 7 shows a perspective view of the embodiment shown in FIGS. 4, 5 and 6, with the weighing pan removed;

FIG. 8 shows the front view of a further embodiment of the present invention;

FIG. 9 shows a plan view of the embodiment shown in FIG. 8, with the weighing pan removed;

FIG. 10 shows the cross-sectional view taken along line II—II of FIG. 8;

FIG. 11 shows a perspective view of the embodiment shown in FIGS. 8, 9 and 10, with the weighing pan removed.

DETAILED DESCRIPTION OF THE INVENTION

Figure 12A:
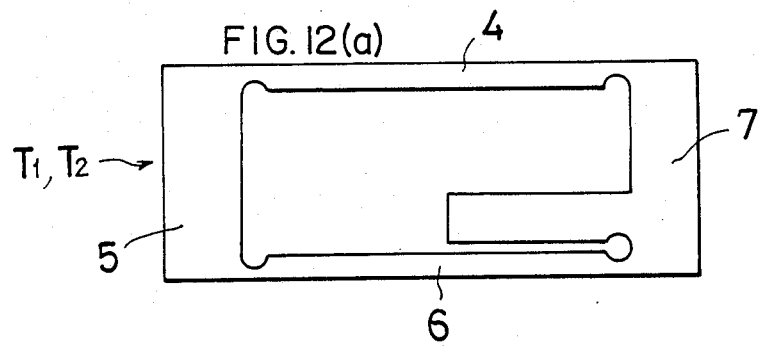
FIGS. 12(a) and 12(b) show the patterns of the frame plates used in the embodiment shown in FIGS. 8 to 11.
Figure 12B:
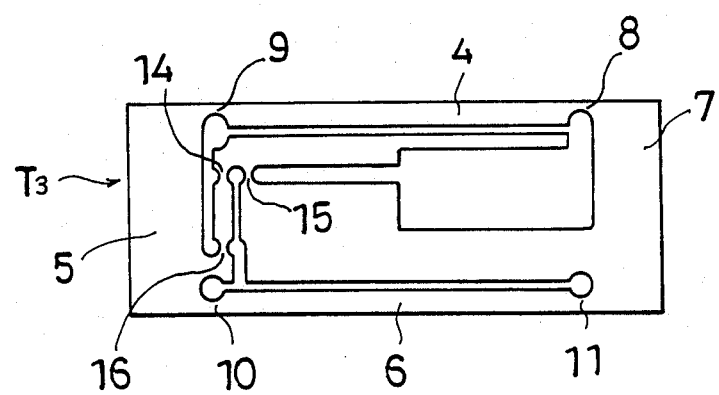

Referring to FIG. 1, which shows the front view of the electronic balance embodied as an embodiment of the present invention, the force due to a weight loaded on a weighing pan 3 is to be transmitted to an electromagnetic force transducer 2 through a weight force transmitting system 1. The system 1 is made of a die-cast block of aluminum alloy from which both a Roberval mechanism and a lever mechanism are cut out so as to make both the mechanisms integrated in one continuous system. In the weight force transmitting system 1, the Roberval mechanism forms a parallelogram consisting of four side portions 4, 5, 6 and 7 kept continuous with thinned resilient portions 8, 9, 10 and 11. Of the four side portions 4 to 8, one vertical side portion 7 is fixed to a frame 17 by means of bolts 18 and 19, while another vertical portion 5 supports the weighing pan 3 through a pan support 20. On the other hand the lever mechanism consists of a lever 12 and a connecting portion 13 connecting the lever 12 to the vertical side portion 5 of the Roverval mechanism. Two thinned resilient portions 14 and 16 provided at both ends of the connectiong portion 13 are to enable a force to be resistlessly transmitted between the lever 12 and the vertical side portions 5 of the Roberval mechanism, while a thinned resilient portion 15 functions as the fulcrum of the lever 12. To the free end of the lever 12 is fixed a force coil 24, which is one of the constituents of an electromagnetic force transducer 2 consisting of said force coil 24, a permanent magnet 21, a pole piece 22 and a yoke 23. The electromagnetic force transducer 2 offsets the deflection of the lever 12 with the force coiol 24 supplied with a force-compensating current from an electronic control circuit (not shown) in accordance with an output signal from a lever deflection detector (not shown) for detecting the deflection of the lever 12. Such an electronic weight sensing system is not described in further detail here because it not only belongs to a well known technology but also is outside the subject of the present invention. With the weight force transmitting systmem 1 only constituted as described above, if the weighing pan 3 is loaded with a weight such that the weight distribution of the weight is partial perpendicularly to the length direction of the weight force transmitting system 1, a torsional force acts on the vertical side portion 5 of the Roberval mechanism. To prevent this undesirable torsional force from being transmitted to the lever 12, the connecting portion 13 has its width cut down narrow in the middle of its length, as is illustrated in FIG. 2, to form there a thin resilient neck 13a. This resilient neck 13 absorbs the torsional force and prevents it from being transmitted to the lever 12. A perspective view of this embodiment is shown in FIG. 3, in which, however, the weighing pan 3 is removed.

In the following another embodiment of the present invention is described according to FIGS. 4 to 7, in which the constituents and portions corresponding to those defined in the above embodiment are indicated with the same reference numerals and signs as those used in FIGS. 1 to 3, and the detailed descriptions of those constituents and portions are omitted in sub substance.

According to FIG. 4, which shows the front view of this embodiment, the external appearance of the same is very similar to to that of the preceding embodiment. In this embodiment, however, the weight force transmitting system 1 is made not of a single metal block, but of two metal plates kept parallel to each other with spacers purposefully interposed therebetween. The two metal plates (indicated with reference signs $T_1$ and $T_2$ in FIGS. 5, 6 and 7) are cut out substantially in the same pattern as the weight force transmitting system usedin the preceding embodiment. As is understood from FIGS. 5, 6 and 7, which respectively show the plan view (with the weighing pan 3 removed), the cross-sectional view taken along line I—I of FIG. 4 and a plan view (with the weighing pan 3 removed), all being of the present embodiment, the corresponding Roberval mechanism parts (consisting of their respective side portions 4, 5, 6 and 7) and lever parts 12 of the two plate $T_1$ and $T_2$ are fixed, with the thinned resilient portions 8 to 11 and 14 to 16 excluded, to each other with their respective spacers 4a (FIGS. 5,6 and 7), 5a (FIGS. 5 and 7), 6a (FIG. 6) and 7a (FIGS. 5 and 7) interposed therebetween. This embodiment can be further modified by increasing the number of such frame plates cut out substantially in the same pattern as the weight force transmitting systems employed in the above embodiments. In the following, one of such modifications is described on reference to FIGS. 8 to 12(a) and (b).

In this modified embodiment, the weight force transmitting system 1 consists of three frame plates $T_1$, $T_2$ and $T_3$ fixed assembled with spacers interposed. According to this embodiment, however, two outer plates $T_1$ and $T_2$ are lacking in their respective lever portions, as is best shown in FIG. 10, which the cross-section taken along line II—II of FIG. 8 showing the front view of this embodiment. FIGS. 9 and 11 respectively show the plan view and a perspective view, both being of this embodiment, with their respective weighing pans 3 removed. In FIGS. 9 to 11 reference signs 4b to 7b and 4c to 7c indicate spacers. Further, FIGS. 12(a) and (b) are given to show the the patterns of the frame plate $T_1$, $T_2$ and $T_3$.

Figure 13:
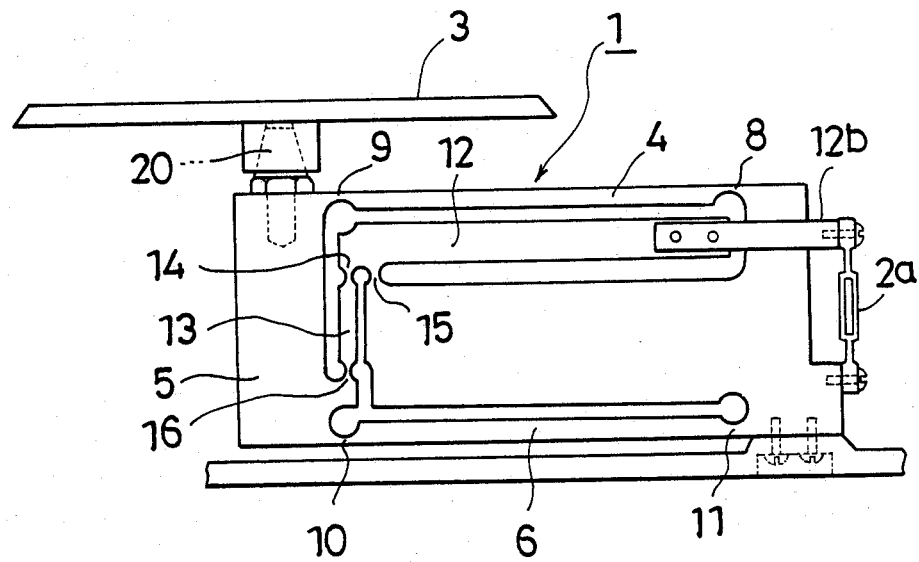
FIG. 13 shows the front view of a still further embodiment of the present invention.

Although, in every embodiment descibed above, an electromagnetic force transducer 2 is used as a constituent of the weight sensing means, it is needless to say that the present invention can be embodied by replacing such a force transducer with any suitable known sensors such as a vibrating string type, a tuning fork type, a capacitor type, an induction coil type, a strain gauge type and others. As an example, FIG. 13 shows an embodiment in which a tuning fork type sensor 2a is used. In this embodimet the strain gauge 2a is located outside the weight force transmitting system 1 with the lever 12 extended outward by an extension arm 12b.

According to the present invention, sensitivity of the weight force transmitting system depends both on the thickness of the block constituting the system and on the depths of cutting down at the thinned resilient portions 8 to 11 and 14 to 16 in case of the type shown in FIGS. 1 to 3, and also on the number of frame plates in case of the types as shown in FIGS. 4 to 7 and 8 to 11. However, if the system is applied to a zero-method of balancing, the sensitivity is made substantially free from the dependency on the above mentioned cutting depths, which are limited by the mechanical strength required for the system. Therefore, the present invention, though embodied with various types of weight sensors as mentioned above, is best embodied by employing such a zero-method sensing method as that using an electromagnetic force transducer.

Electric wire-spark machining is one of the suitable methods for cutting out the weight force transmitting system or the frame plates constituting the system. However, if such a method is used, the cut surfaces must be surface-treated, for instance, by means of chemical treatment for the purpose of removing any possible adverse effect produced on the surfaces by the heat of electric sparking.

I claim:
1. An electronic balance comprising:
   a weighing pan;
   an electronic weight sensing means; and
   a force transmitting means for transmitting a force due to a weight loaded on said weighing pan to said electronic weight sensing means, said force transmitting means being constituted in one metallic body from which are integratedly cut out a Rober- val mechanism, a lever and a connecting portion connecting said lever to said Roberval mechanism.

2. An electronic balance defined in claim 1, wherein said connecting portion has its width cut down narrow partially to form a neck-shaped portion.

3. An electronic balance comprising:
a weighing pan;
an electronic weight sensing means; and
a force transmitting means for transmitting a force due to a weight loaded on said weighing pan to said electronic weight sensing means, said force transmitting means being constituted of a plurality of frame plates fixed together with spacers interposed therebetween, each of said frame plates being made of a metallic plate from which are integratedly cut out a pattern of a Roberval mechanism, a pattern of a lever and a pattern connecting said pattern of said lever to said pattern of said Roberval mechanism.

4. An electronic balance defined in claim 1, 2 or 3, wherein said electronic weight sensing means is a weight sensor of a zero-method of balancing type.

5. An electronic balance defined in claim 4, wherein said weight sensor of zero-method balancing type comprises an electromagnetic force transducer.

* * * * *